United States Patent Office 3,462,295
Patented Aug. 19, 1969

3,462,295
PROCESS FOR RENDERING CELLULOSIC AND
FIBROUS MATERIALS OIL - WATER - REPEL-
LENT AND PRODUCT THEREFROM
Lyle F. Elmquist, North St. Paul, and Marwan R. Kamal, Minneapolis, Minn., assignors to General Mills, Inc., a corporation of Delaware
No Drawing. Filed Feb. 17, 1966, Ser. No. 528,065
Int. Cl. D06m 13/42; C09d 3/48
U.S. Cl. 117—143                9 Claims

ABSTRACT OF THE DISCLOSURE

Fibrous materials are treated with a combination of treating agents including a polyisocyanate of the formula $$[R + (CH_2)_y NCO]_x$$

where $y$ is 0 or 1, $x$ is 2 to about 4 and R is the hydrocarbon group of polymeric fat acids and a fluorocarbon oil repellent.

---

The present invention relates to the treatment of various fibrous materials with the combination of certain polyisocyanate compounds and fluorocarbon oil repellent compounds and to the products of such treatment.

Various treatments have been advocated in the past for fibrous materials to modify certain physical characteristics thereof such as softness, water repellency, crease resistance, tear resistance and the like. It has now been discovered that improved properties can be contributed to fibrous materials by the treatment of such materials with the combination of certain polyisocyanates and fluorocarbon compounds.

It is therefore an object of the present invention to provide a novel process for the treatment of fibrous materials with the combination of certain polyisocyanates and fluorocarbon oil repellent compounds to modify the physical characteristics thereof. It is another object of the present invention to provide novel fibrous materials treated with the combination of certain polyisocyanates and fluorocarbon compounds.

In our prior application, Ser. No. 475,562, filed July 28, 1965, there is disclosed the treatment of fibrous materials with certain polyisocyanates. This treatment is disclosed as rendering the fibrous materials soft or water-repellent. This treatment, however, resulted in virtually no oil-repellency of the fibrous materials. It has now been discovered that the treatment of fibrous materials with a combination of these polyisocyanates and fluorocarbon compounds results in a synergistic effect with reference to oil-repellency without any loss of water-repellency or of softness. In fact, the water-repellency may, in some instances, even be improved by the combination treatment.

The polyisocyanates employed in the present invention are disclosed and claimed in application Ser. No. 250,211, filed Jan. 9, 1963, and have the following idealized, structural formula:

$$[R + (CH_2)_y NCO]_x$$

where $y$ is 0 or 1, $x$ is an integer of 2 to about 4 and R is the hydrocarbon group of polymeric fat acids.

The polyisocyanates wherein $y$ is 0 are prepared by converting the polymeric fat acids to the corresponding polymeric acid chlorides, reacting the acid chlorides with a metal azide to form the polymeric acyl azides and then heating the acyl azides to produce the polyisocyanates. This method of preparation can be conveniently illustrated by the following equations (using a dimeric fat acid as an example):

$$3R(COOH)_2 + 2PCl_3 \longrightarrow 3R(COCl)_2 + 2H_3PO_3$$
$$R(COCl)_2 + 2NaN_3 \longrightarrow R(CON_3)_2 + 2NaCl$$
$$R(CON_3)_2 \xrightarrow{\Delta} R(NCO)_2 + 2N_2$$

The polyisocyanates wherein $y$ is 1 are prepared by converting the polymeric fat acids to the corresponding polynitriles and then hydrogenating the polynitriles in the presence of ammonia and a catalyst such as Raney nickel to form polyamines. The polyamines are then reacted with phosgene to give the polyisocyanates. This method of preparation can be conveniently illustrated by the following equations (using a dimeric fat acid as an example):

$$R(COOH)_2 + 2NH_3 \longrightarrow R(CN)_2 + 4H_2O$$
$$R(CN)_2 + 4H_2 \xrightarrow[\text{Catalyst}]{NH_3} R(CH_2NH_2)_2$$
$$R(CH_2NH_2)_2 + COCl_2 \xrightarrow{\Delta} R(CH_2NCO)_2 + 2HCl$$

The polymeric fat acids, useful as the starting materials for preparing our polyisocyanates, are prepared by polymerizing a fat acid. The term "fat acid" as used herein refers to naturally occurring and synthetic monobasic aliphatic acids having hydrocarbon chains of 8–24 carbon atoms. The term "fat acids," therefore, includes saturated, ethylenically unsaturated and acetylenically unsaturated acids. "Polymeric fat radical" is generic to the divalent, trivalent and polyvalent hydrocarbon radicals of dimerized fat acids, timerized fat acids and higher polymers of fat acids, respectively. These divalent and trivalent radicals are referred to herein as "dimeric fat radical" and "trimeric fat radical."

The saturated, ethylenically unsaturated, and acetylenically unsaturated fat acids are generally polymerized by somewhat different techniques, but because of the functional similarity of the polymerization products, they all are generally referred to as "polymeric fat acids."

Saturated fat acids are difficult to polymerize, but polymerization can be obtained at elevated temperatures with a peroxidic reagent such as di-t-butyl peroxide. Because of the low yields of polymeric products, these materials are not commercially significant. Suitable saturated fat acids include branched and straight chain acids such as caprylic acid, pelargonic acid, capric acid, lauric acid, myristic acid, palmitic acid, isopalmitic acid, stearic acid, arachidic acid, behenic acid and lignoceric acid.

The ethylenically unsaturated acids are much more readily polymerized. Catalytic or non-catalytic polymerization techniques can be employed. The non-catalytic polymerization generally requires a higher temperature.

Suitable agents for the polymerization include acid or alkaline clays, di-t-butyl peroxide, boron trifluoride and other Lewis acids, anthraquinone, sulfur dioxide and the like. Suitable monomers include the branched and straight chain, poly- and monoethylenically unsaturated acids such as 3-octenoic acid, 11-dodecenoic acid, linderic acid, lauroleic acid, myristoleic acid, tsuzuic acid, palmitoleic acid, petroselinic acid, oleic acid, elaidic acid, vaccenic acid, gadoleic acid, cetoleic acid, nervonic acid, linoleic acid, linolenic acid, eleostearic acid, hiragonic acid, moroctic acid, timnodonic acid, eicosatetraenoic acid, nisinic acid, scoliodonic acid and chaulmoogric acid.

Acetylenically unsaturated fat acids, such as isanic and isanolic acids, can also be polymerized to give polymeric acids which can be used. The acetylenically unsaturated acids occur only rarely in nature and are expensive to synthesize. Therefore, they are not currently of commercial significance.

Although any one of the above-described saturated, ethylenically unsaturated and acetylenically unsaturated fat acids may be used to prepare the polymeric fat acids, it is generally the practice in the art to polymerize mixtures of acids (or the simple aliphatic alcohol esters—i.e., the methyl esters) derived from the naturally occurring drying and semi-drying oils. Suitable drying and semi-drying oils include soybean, linseed, tall, tung, perilla, oiticia, cottonseed, corn, sunflower, dehydrated castor oil and the like. Also, the most readily available acids are oleic and linoleic and thus they are preferred starting materials for the preparation of the polymeric fat acids. It is preferred to employ as starting materials in the preparation of the polyisocyanates relatively pure dimerized fat acids. Such acids can be obtained from mixtures containing monomer, the dimerized fat acids, trimerized fat acids and higher polymers by high vacuum distillation or solvent extraction. The use of relatively pure dimerized fat acids as a starting material is advantageous where a diisocyanate is to be prepared for use as a monomer in the preparation of linear high molecular weight polymers. Relatively pure trimerized fat acids can be used where a triisocyanate of high purity is desired. Of course, mixtures of the polymerized fat acids can also be used to prepare mixtures of polyisocyanates. Any of the described unsaturated polymeric fat acids can be hydrogenated prior to the use thereof in the polyisocyanate preparation.

A variety of fluorocarbon oil-repellent compounds are known and are commercially available, and are useful for the present invention. One particular group of fluorocarbon oil repellents are the polymers obtained by polymerizing an ethyleneically unsaturated fluorocarbon compound. The ethylenic unsaturation may be either in the alcohol or the acid portion of the ester molecule. Typically, the unsaturated radical in the alcohol portion of the ester may be the allyl radical or the vinyl radical. Typical unsaturated acids used to prepare the ester include acrylic acid, methacrylic acid and crotonic acid. In general, the perfluoro portion of the molecule should be in the saturated portion of the molecule. The unsaturated portion of the molecule is preferably not fluorinated in each instance. The acid and alcohol radicals should contain from 2 to 6 carbon atoms excluding the carbonyl carbon of the acid. Examples of such monomers include vinyl perfluorobutyrate and perfluorobutyl acrylate. These monomers may be polymerized as homopolymers or as copolymers by normal emulsion polymerization techniques using free radical catalysts. Fluorocarbon oil repellents of the above types are available commercially from the 3M Company under the designations "Textile Chemicals FC-205 and FC-208." These contain approximately 28% active ingredients with the balance being a solvent system consisting of acetone, ethylene glycol and water. Other perfluorocarbon oil repellents may also be used. Some of these repellents are disclosed in an article by Grajeck et al. appearing in The Textile Research Journal, April 1962, pp. 320–331.

The above isocyanates and fluorocarbons may be used to treat a wide variety of fibrous material. These materials are principally cellulosic in nature, although the invention may also be used for the treatment of noncellulosic fibers, such as wool and other animal fibers as well as synthetic cellulosic and noncellulosic fibers, such as viscose rayon, cuprammonium rayon, cellulose acetate, nylon, polyester fibers and the like, and mixtures of fibers such as mixtures of cotton and polyester fibers. The invention is applicable to the treatment of woven textile materials from the above sources as well as fibrous sheets, pads, films and the like, laid down from such fibers even though in a non-woven form. It is also applicable to other forms of the fibers as, for example, cellulose sponge.

In the treatment of the cellulosic materials or other materials in accordance with the present invention, it is possible to use the isocyanate on these materials directly or the isocyanate may be used in admixture with other treating agents usually employed in treating the cellulosic materials. Thus, the isocyanate may be used in admixture with polyvinyl acetate, starch and other additives and these mixtures then may be used for treating the cellulosic material. In many instances, the isocyanate may react either partially or entirely with the hydroxyl or other functional groups in the other additives.

The nature of the reaction, if any, between the fibrous material and the isocyanate is not known. It is, of course, possible that the isocyanate groups may react with hydroxyl groups or other functional groups in the cellulosic molecule and may react with amine groups or other functional groups in noncellulosic fibrous materials, such as wool. It is also possible that the action which is obtained by the treatment of the isocyanate with the fibrous material is physical in nature. A further possibility is that the isocyanates may form homopolymers through reaction between water and the isocyanate groups to form polyureas. Regardless of what the physical or chemical action is which takes place, it has been observed that the treatment of the fibrous material with the isocyanates does modify the physical properties of the fibrous material. This modification may be in any of a number of ways, including softening, water repellency, wrinkle resistance, tear resistance and other related properties.

The nature of the action of the fluorocarbons on the fibrous material is likewise not known. However, since the fluorocarbons are essentially inert, it is believed that the action of the fluorocarbons is essentially physical. The nature of the interaction between the isocyanate and the fluorocarbon in effecting oil-repellency is likewise not known. It has been observed, however, that there is a synergistic effect in that the isocyanates by themselves contribute virtually no oil-repellency to the fibrous materials whereas the combination of the isocyanates and the fluorocarbons produces a degree of oil-repellency greater than that of the fluorocarbons alone.

The process of treating can be effected in any of a number of ways. The polyisocyanate and the fluorocarbon may be dissolved in a suitable organic solvent or solvents and the solution thus obtained applied to the fibrous material. It is sometimes preferred, however, to emulsify the polymeric fat polyisocyanate in an aqueous system and mix a solution or emulsion of the fluorocarbon with the isocyanate emulsion and then treat the fibrous material with the aqueous emulsion. The polymeric fat acid isocyanate is very slowly reactive toward water and, accordingly, there is no great loss of isocyanate groups in the limited period of time that aqueous emulsion is formed and applied to the fibrous material.

The following examples will serve to illustrate the invention. In these examples, the polyisocyanate employed is referred to as dimeryl isocyanate, which is the diisocyanate prepared from essentially pure dimeric fatty acid, which, in turn, is derived from the dimerization of a mixture of oleic and linoleic acids. In this particular instance, the isocyanate was formed via the phosgene route.

Example 1

A series of tests were conducted on cotton twill fabric and on polyester/cotton fabric with dimeryl isocyanate, with fluorocarbon oil repellents and combinations of the same. The treating agents were prepared in the form of a dispersion or emulsion with the active ingredients at the concentrations indicated in the following tables. The indicated fluorocarbon dispersions were obtained by diluting the commercial products as obtained with water to the required level for treatment. The dimeryl isocyanate emulsions were prepared by diluting with water a 50% emulsion prepared using 1% of an emulsifier (Triton X-114–Rohm & Haas). Where a combination treatment was involved, a single treating bath containing both components at the indicated concentrations was prepared.

Treatment of the fabrics was carried out by dipping the fabric in the treating emulsions for one minute, wringing out to a 77 to 87% wet pickup for cotton twill and to a 84–89% pickup for the polyester/cotton. The fabrics were then dried for 12 minutes at 91 to 126° C. followed by curing for 5 to 6 minutes at up to 170° C. The treated samples were then washed without detergent and again dried for 5 minutes at temperatures up to 155° C.

Oil-repellency and water-repellency tests were run on the fabrics after zero and after 5 washes using a normal wash cycle with a commercial detergent (Tide). Oil-repellency tests were carried out according to the Oil Repellency Test described in the bulletin on "Textile Chemicals" published by the 3M Company. Water-repellency tests were carried out according to the Spray Test (AATCC 22–1964) and the Hydrostatic Pressure Test (AATCC 18–1964). The results obtained are indicated in the following tables.

| | Oil repellency rating | | | |
|---|---|---|---|---|
| | Cotton twill | | Polyester/cotton | |
| Treatment | 0 washes | 5 washes | 0 washes | 5 washes |
| Control | 0 | | 0 | |
| 1% dimeryl isocyanate | 0 | 0 | 0 | 0 |
| 0.3% FC-205 | 70–80, 70 | 0–50 | | |
| 0.7% FC-205 | 90, 90 | 70 | | |
| 0.3% FC-205+1% dimeryl isocyanate | 100–110, 110+ | 80–90 | | |
| 0.7% FC-205+1% dimeryl isocyanate | 100, 110+ | 90–100 | | |
| 0.3% FC-208 | 0, 50 | 0 | 80–90, 70–80 | 50–60 |
| 0.7% FC-208 | 80, 80 | 60–70 | 90, 100 | 90–100 |
| 0.3% FC-208+1% dimeryl isocyanate | 110+, 110+ | 100 | 110+, 110+ | 100 |
| 0.7% FC-208+1% dimeryl isocyanate | 110+, 110+ | 100–100 | 110+, 110+ | 110+ |

| | Water repellency-spray rating | | | |
|---|---|---|---|---|
| | Cotton twill | | Polyester/cotton | |
| Treatment | 0 washes | 5 washes | 0 washes | 5 washes |
| Control | 0 | | 0 | |
| 1% dimeryl isocyanate | 90 | 50–70 | 90 | 50–70 |
| 0.3% FC-205 | 50 | 50–70 | | |
| 0.7% FC-205 | 90 | 70 | | |
| 0.3% FC-205+1% dimeryl isocyanate | 100 | 90 | | |
| 0.7% FC-205+1% dimeryl isocyanate | 100 | 90 | | |
| 0.3% FC-208 | 70 | 0 | 100 | 50 |
| 0.7% FC-208 | 90 | 70–80 | 100 | 90 |
| 0.3% FC-208+1% dimeryl isocyanate | 90–100 | 90 | 100 | 80–90 |
| 0.7% FC-208+1% dimeryl isocyanate | 100 | 90 | 100 | 90 |

| | Water repellency, hydrostatic pressure test (cm.) | | | |
|---|---|---|---|---|
| | Cotton twill | | Polyester/cotton | |
| Treatment | 0 washes | 5 washes | 0 washes | 5 washes |
| Control | 0 | | 0 | |
| 1% dimeryl isocyanate | 33.7 | 24.7 | 25.7 | 21.0 |
| 0.3% FC-205 | 28.0(wets) | 25.3(wets) | | |
| 0.7% FC-205 | 31.0 | 28.7(wets) | | |
| 0.3% FC-205+1% dimeryl isocyanate | 36.3 | 28.7 | | |
| 0.7% FC-205+1% dimeryl isocyanate | 32.0 | 27.0 | | |
| 0.3% FC-208 | 26.7(wets) | Below 10 | 32.7 | 19.7(wets) |
| 0.7% FC-208 | 33.3 | 28.7(wets) | 31.0 | 23.3 |
| 0.3% FC-208+1% dimeryl isocyanate | 38.3 | 28.3 | 30.7 | 23.3 |
| 0.7% FC-208+1% dimeryl isocyanate | 38.3 | 27.3 | 25.3 | 21.3 |

Example 2

A second series of tests was run on cotton twill according to the general procedure described in Example 1. The concentrations of the active ingredients in the solutions are indicated in the following table. In this instance, the pickup by the fabric was essentially 100% so that these concentrations were likewise the concentrations of the active ingredients in the dried fabric.

In this series of tests, the drying was conducted for a period of fifteen (15) minutes at 135° C. followed by curing for three (3) minutes at temperatures up to 165° C. Following curing, the samples were washed and again dried for fifteen (15) minutes at 135° C. The series of samples indicated as having a low temperature cure were treated exactly as the remaining samples except that the three-minute cure at 165° C. was omitted. The results are indicated in the following table.

higher levels of 0.5% of the isocyanate on up to 5 and, in some instances, even 10% may be used. Good results are obtainable at relatively low levels for both softening and water repellency. The higher levels may be desirable where especially high degrees of water repellency are desired.

The fluorocarbon oil repellent is also effective in small quantities. Usually it is employed in the range of 0.1%–2.0% based on the weight of the fibrous material.

The embodiments of the invention in which an exclusive property or privilege is claimed are defined as follows:

1. A fibrous material treated with a combination of treating agents comprising (1) a polyisocyanate having the formula:

$$[R\text{-}(CH_2)_y NCO]_x$$

where $y$ is an integer selected from 0 and 1, $x$ is an integer

|  | Oil repellency |  | Water repellency |  |  |  |
|---|---|---|---|---|---|---|
|  |  |  | Spray rating |  | Hydrostatic pressure |  |
| Treatment | 0 washes | 5 washes | 0 washes | 5 washes | 0 washes | 5 washes |
| .5% dimeryl isocyanate | 0 | 0 | 90 | 70/80 | 29 | 19 |
| 1.0% dimeryl isocyanate | 0 | 0 | 80 | 80/90 | 29 | 21 |
| 0.15% FC-205 | 70 | 0 | 50 | 50 | 30 | 14 |
| 0.3% FC-205 | 80 | 70 | 90 | 70 | 32 | 26 |
| 0.5% FC-205 | 90 | 80 | 100 | 80 | 34 | 25 |
| 0.5% dimeryl isocyanate+0.15% FC-205 | 90 | 80 | 100 | 100 | 32 | 26 |
| 0.5% dimeryl isocyanate+0.3% FC-205 | 100 | 90 | 100 | 100 | 33 | 26 |
| 0.5% dimeryl isocyanate+0.5% FC-205 | 100 | 90 | 100 | 100 | 29 | 25 |
| 1.0% dimeryl isocyanate+0.15% FC-205 | 100 | 80 | 100 | 100 | 34 | 25 |
| 1.0% dimeryl isocyanate+0.3% FC-205 | 110 | 100 | 100 | 100 | 32 | 26 |
| 1.0% dimeryl isocyanate+0.5% FC-205 | 110 | 100 | 100 | 100 | 33 | 26 |
| 0.15% FC-208 | 50 | 0 | 50 | 50 | 18 | 5 |
| 0.3% FC-208 | 60 | 0 | 90 | 50/70 | 34 | 13 |
| 0.5% FC-208 | 80 | 70 | 100 | 90 | 32 | 25 |
| 0.5% dimeryl isocyanate+0.15% FC-208 | 70 | 60 | 100 | 100 | 31 | 26 |
| 0.5% dimeryl isocyanate+0.3% FC-208 | 90 | 80 | 100 | 100 | 32 | 25 |
| 0.5% dimeryl isocyanate+0.5% FC-208 | 100 | 90 | 100 | 100 | 33 | 25 |
| 1.0% dimeryl isocyanate+0.15% FC-208 | 80 | 70 | 100 | 90/100 | 36 | 24 |
| 1.0% dimeryl isocyanate+0.3% FC-208 | 110 | 90 | 100 | 100 | 32 | 24 |
| 1.0% dimeryl isocyanate+0.5% FC-208 | 110 | 100 | 100 | 100 | 30 | 24 |
| Low temp. cure: |  |  |  |  |  |  |
| 1.0% dimeryl isocyanate | 0 | 0 | 90 | 80/90 | 28 | 18 |
| 0.3% FC-208 | 70 | 70 | 90 | 50/70 | 32 | 20 |
| 1.0% dimeryl isocyanate+0.3% FC-208 | 100 | 100 | 100 | 100 | 32 | 27 |

These results show that a synergistic effect is obtained when the dimeryl isocyanate is used with the fluorocarbon oil repellents. The oil repellency obtained for the combination is improved as compared with the fluorocarbon alone even though the dimeryl isocyanate by itself has no apparent oil repelling properties. Water repellency of fabrics treated with this combination is also generally improved over use of each product alone. This is especially true on the cotton twill fabric.

While various examples have been given to illustrate the invention, it is to be understood that the same is not limited thereto but conisderable variation may be made in the scope of the invention. For example, a wide variety of solvents may be used for the application of the treating agents to the fibrous material. Similarly, a wide variety of emulsions, emulsifying agents and the like may be used. Relatively small quantities of the treating agents are effective to modify properties somewhat. The degree to which the properties are modified depends to some extent on the concentration employed. In general, even minute quantities produce some results.

In general, for softening purposes, quantities of the isocyanate of 0.1% and above based on the weight of the fibrous material should be used. For water repellency, of 2 to about 4 and R is the hydrocarbon group of polymeric fat acids $R(COOH)_x$, said polymeric fat acids having been prepared by polymerizing fat acids of 8–24 carbon atoms, and (2) a fluorocarbon oil repellent, said polyisocyanate being employed in a concentration of 0.1% to 10% based on the weight of the fibrous material and said combination of treating agents being employed in an amount sufficient to improve the oil-repellency of the fibrous materials.

2. A fibrous material as defined in claim 1 in which the fluorocarbon oil repellent is employed in a concentration of 0.1% to 2% based on the weight of the fibrous material.

3. A fibrous material as defined in claim 2 in which $y$ is 0.

4. A fibrous material as defined in claim 2 in which $y$ is 1 and $x$ is 2.

5. Product according to claim 2 in which the fibrous material is cellulosic.

6. Product according to claim 2 in which the fibrous material is cotton.

7. Product according to claim 2 in which the fibrous material is a mixture of cotton and polyester.

8. Product according to claim 2 in which the fluorocarbon oil repellent is a polymer of vinyl perfluorobutyrate.

9. Product according to claim 2 in which the fluorocarbon oil repellent is a polymer of perfluorobutyl acrylate.

References Cited
UNITED STATES PATENTS

| | | | |
|---|---|---|---|
| 2,642,416 | 6/1953 | Ahlbrecht et al. | 117—136 |
| 2,893,898 | 7/1959 | Evans et al. | 8—116.2 X |
| 3,326,713 | 6/1967 | Smith et al. | 117—143 X |
| 3,336,157 | 8/1967 | Shane et al. | 117—121 X |
| 3,365,329 | 1/1968 | MacKenzie et al. | |

OTHER REFERENCES

Goldstein, H.: Textile Res. Journal, vol. 31, 377–87 (1961).

WILLIAM D. MARTIN, Primary Examiner

H. J. GWINNELL, Assistant Examiner

U.S. Cl. X.R.

8—116.2, 127.6; 117—121, 138.8, 139.5, 161, 167